US010825325B2

(12) United States Patent
Madden et al.

(10) Patent No.: US 10,825,325 B2
(45) Date of Patent: Nov. 3, 2020

(54) GUN PROXIMITY ELECTRONIC TETHER AND ALERT

(71) Applicant: ArmzReach, Inc., Howell, MI (US)

(72) Inventors: Michael Paul Madden, Howell, MI (US); Russell Carl Jahnke, Pinckney, MI (US); Dejan Teofilovic, Ann Arbor, MI (US); Uros Tomanovic, Beograd (RS)

(73) Assignee: ArmzReach, Inc., Howell, MI (US)

( * ) Notice: Subject to any disclaimer, the term of this patent is extended or adjusted under 35 U.S.C. 154(b) by 0 days.

(21) Appl. No.: 16/572,730

(22) Filed: Sep. 17, 2019

(65) Prior Publication Data

US 2020/0090489 A1     Mar. 19, 2020

Related U.S. Application Data

(60) Provisional application No. 62/732,142, filed on Sep. 17, 2018.

(51) Int. Cl.
| | |
|---|---|
| *H04W 64/00* | (2009.01) |
| *H04W 48/04* | (2009.01) |
| *G08B 21/16* | (2006.01) |
| *G08B 21/24* | (2006.01) |
| *G08B 7/06* | (2006.01) |
| *H04B 17/318* | (2015.01) |
| *H04W 4/02* | (2018.01) |
| *H04W 4/80* | (2018.01) |

(52) U.S. Cl.
CPC .............. *G08B 21/24* (2013.01); *G08B 7/06* (2013.01); *H04B 17/318* (2015.01); *H04W 4/023* (2013.01); *H04W 4/80* (2018.02)

(58) Field of Classification Search
CPC ...................................... F41A 17/063
See application file for complete search history.

(56) References Cited

U.S. PATENT DOCUMENTS

| | | | |
|---|---|---|---|
| 2015/0254968 A1* | 9/2015 | Sanders | G08B 25/016 340/539.13 |
| 2016/0173832 A1* | 6/2016 | Stewart | F41A 35/00 348/158 |
| 2017/0010062 A1* | 1/2017 | Black | G01S 5/0027 |
| 2018/0206177 A1* | 7/2018 | Daoura | G08B 21/24 |
| 2019/0033043 A1* | 1/2019 | Piccioni | H04Q 9/00 |
| 2019/0063864 A1* | 2/2019 | Stewart | F41A 17/063 |

* cited by examiner

*Primary Examiner* — Joseph H Feild
*Assistant Examiner* — Pameshanand Mahase
(74) *Attorney, Agent, or Firm* — Carlson, Gaskey & Olds, P.C.

(57) ABSTRACT

A method for maintaining possession of a firearm includes the steps of transmitting a signal between a first transceiver coupled to a firearm and a second transceiver of a secondary carry implement. The secondary carry implement has an alert component. The alert component is activated when a predetermined proximity between the firearm and the secondary carry component is exceeded. The predetermined proximity is inferred from signal strength from the first transceiver that is detected by the second transceiver.

19 Claims, 5 Drawing Sheets

GUN PROXIMITY ELECTRONIC TETHER AND ALERT

CROSS-REFERENCE TO RELATED APPLICATIONS

This disclosure claims priority to U.S. Provisional Patent Application No. 62/732,142 filed Sep. 17, 2018.

BACKGROUND

It is a known problem that people who carry guns (concealed carry or open carry) need to take them off their person for a variety of reasons, for example, going to the bathroom. There exists the possibility that the gun owner might forget to retrieve the gun before they leave the area. This can create a dangerous situation where a loaded gun is left behind and becomes accessible to whomever comes along next to find the gun. An accidental or intentional discharge of the gun might occur if someone were to find the gun that was left behind and handle it. As a result, the gun owner may be held liable for carelessly leaving a loaded gun accessible to others.

Gun owners tend to distrust technology added to their guns that make them susceptible to remote tracking (e.g., remote monitoring of whereabouts), database hacks (e.g., unauthorized access to gun use data), and function control (e.g., authorized and/or unauthorized control of guns equipped with advanced "smart" features).

SUMMARY

In one exemplary embodiment, a method for maintaining possession of a firearm includes the steps of transmitting a signal between a first transceiver coupled to a firearm and a second transceiver of a secondary carry implement. The secondary carry implement has an alert component. The alert component is activated when a predetermined proximity between the firearm and the secondary carry component is exceeded. The predetermined proximity is inferred from signal strength from the first transceiver that is detected by the second transceiver.

In a further embodiment of any of the above, the method includes a step of carrying the firearm and the carry component on a user. The firearm is separated from the user. The activating step is performed in response to the separating step.

In a further embodiment of any of the above, the method includes a step of providing first and second tracking elements respectively on the firearm and the secondary carry implement.

In a further embodiment of any of the above, the providing step includes stretching a flexible band over a portion of the firearm.

In a further embodiment of any of the above, the providing step includes attaching an adhesive member to the firearm.

In a further embodiment of any of the above, the secondary carry implement is one of a phone, a watch, a holster, a belt, a piece of jewelry, a credit card, a knife, a pen, a credit card, a key fob, a lanyard, a flashlight, or a belt clip.

In a further embodiment of any of the above, the alert component is one of a vibrator, a speaker, or a light.

In a further embodiment of any of the above, the first and second transceivers communicate wirelessly with one another with a signal provided by a ping having duration that is transmitted at an interval.

In a further embodiment of any of the above, the signal is based on one of RFID or Bluetooth.

In a further embodiment of any of the above, the predetermined proximity is determined from signal strength of the ping alone.

In another exemplary embodiment, a system for maintaining possession of a firearm includes a firearm. The system also includes a first tracking element that is removably secured to the firearm. The system further includes a secondary carry implement that has a second tracking element with an alert component. The first and second tracking elements are in communication with one another. The system further includes a controller that is provided in one of the first and second tracking elements. The controller is configured to activate the alert component when a predetermined proximity between the firearm and the secondary carry implement has been exceeded which is inferred from a signal strength from the first tracking element below a threshold.

In a further embodiment of any of the above, the first tracking element is a flexible band.

In a further embodiment of any of the above, the firearm includes a grip. The flexible band is removably arranged about the grip.

In a further embodiment of any of the above, the first tracking element is an adhesive member.

In a further embodiment of any of the above, the alert component is one of a vibrator, speaker or light.

In a further embodiment of any of the above, the alert component is a vibrator.

In a further embodiment of any of the above, the firearm includes a first transceiver. The secondary carry implement includes a second transceiver. The controller is wired to one of the first and second transceivers. The first and second transceivers communicate wirelessly with one another with a signal.

In a further embodiment of any of the above, the signal is based on one of RFID or Bluetooth.

In a further embodiment of any of the above, the predetermined proximity is determined from signal strength alone.

In a further embodiment of any of the above, the system does not connect to a computer, the internet; a database system, or GPS.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

The disclosed system is a proximity alert system of uniquely paired sensors that is limited in its ability sense proximity to a very close range that cannot be accessed remotely or be detected over a long range. The system operates to ensure that the firearm user maintains possession of the firearm, avoiding unintentionally leaving the firearm behind when temporarily removed.

Figure 1:
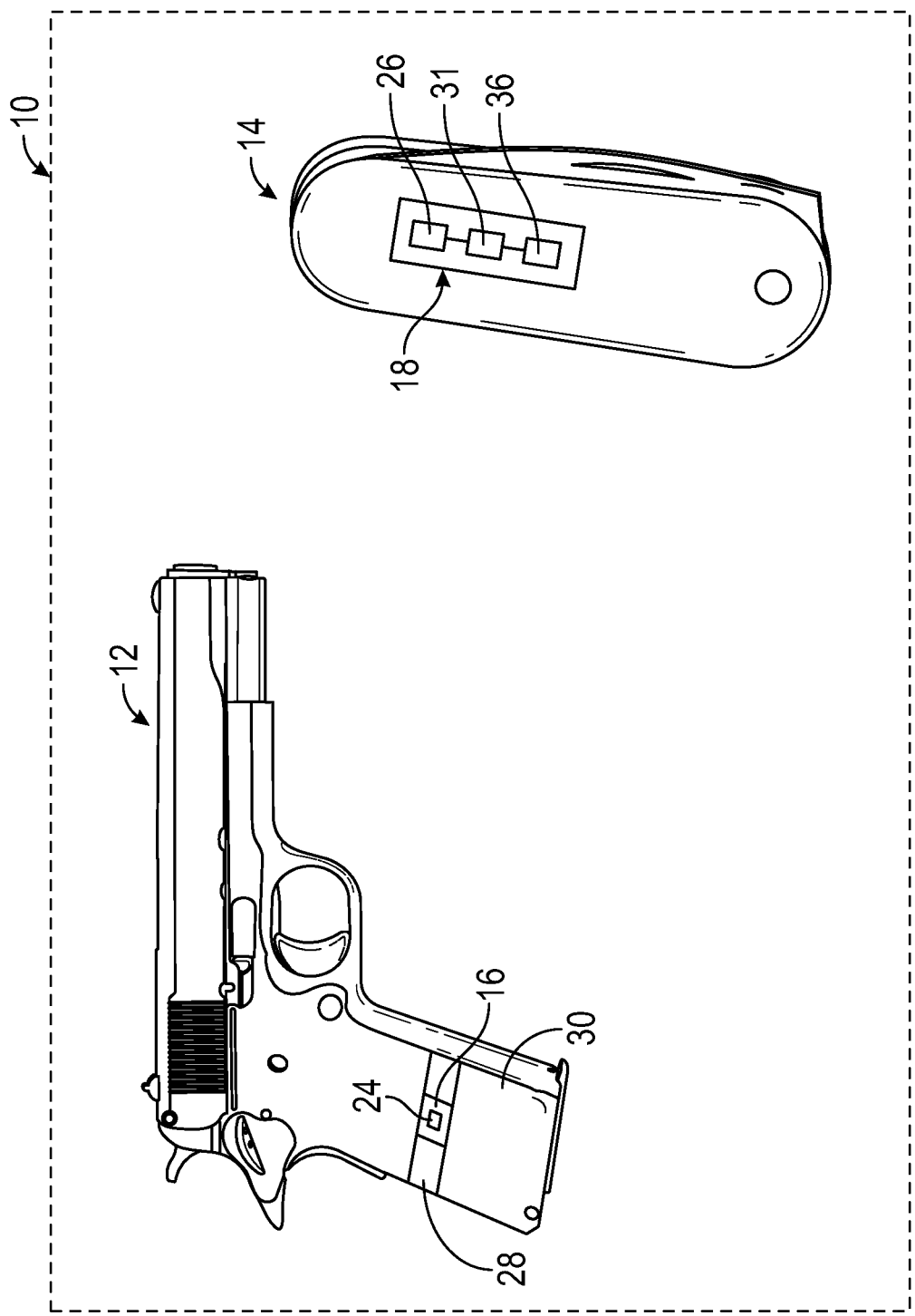
FIG. 1 is a schematic view of a system for maintaining possession of a firearm.

Referring to FIG. 1, a system 10 is shown that can be used to maintain possession of a firearm 12. The system 10 includes the firearm 12, which has a first tracking element 16 removably secured to it. In this manner, the same first tracking element can be used for different firearms. In one example, the first tracking element 16 is a flexible band 28 with the electronics carried by the band. The flexible band 28 can be arranged over the grip 30 of the firearm 12. The band does not interfere with normal gun handling, is sweat and moisture resistant, stands up to the shock of the gun being fired, and works in all weather conditions. Moreover, use of a flexible band enables the user to rotate the band on the opposite side of the shooter's dominant hand to accommodate left-handed and right-handed shooters.

Figure 2A:
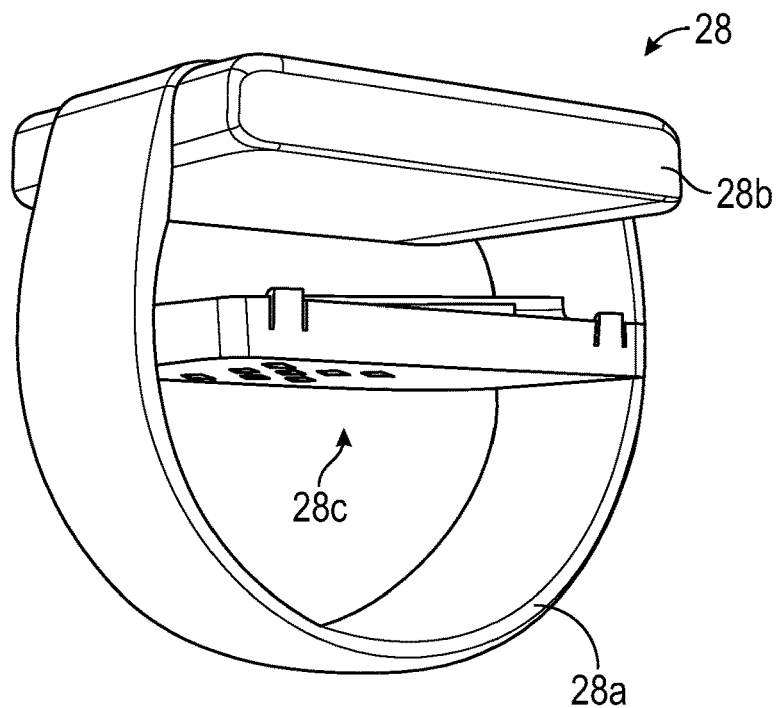
FIG. 2A is an exploded perspective view of an example first tracking element for mounting to a firearm.

One example flexible band 28 is shown in FIG. 2. The band 28 includes a strap 28a supporting a housing 28b. Electronics of the first tracking element 16 are supported in a case 28c received in a cavity in the backside of the housing 28b. The same case 28c can be used with different housings to mount the electronics to the firearm in different types of configurations, as will be appreciated from the other example mounting options below.

Figure 2B:
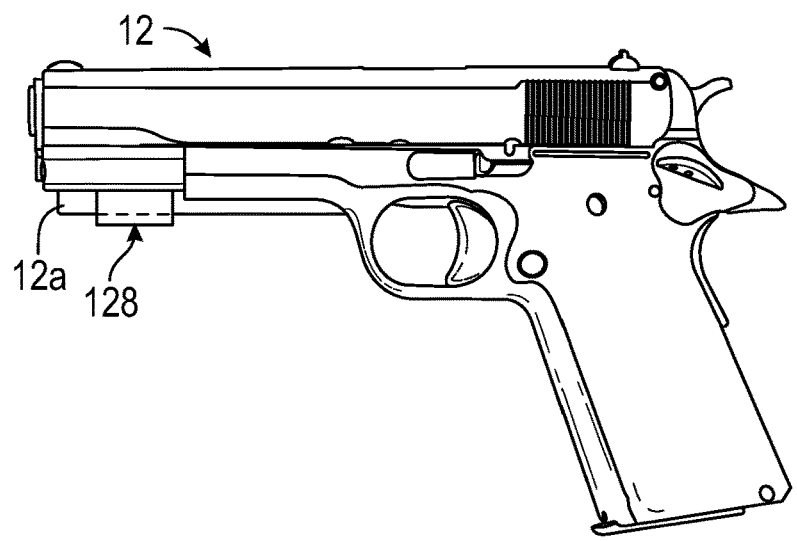
FIG. 2B is a schematic view of another example first tracking element mounted to a firearm.

Another first tracking element 128 is shown mounted to the firearm's rail 12a, as depicted in FIG. 2B. In another embodiment, the first tracking element may be an adhesive member that includes, for example, an RFID chip. The first tracking element 16 may also be provided as a magazine endplate or a grip insert, for example. Depending upon gun and accessory manufacturer, the first tracking element 16 may be integrated into the firearm 12 in a variety of ways.

Figure 3:
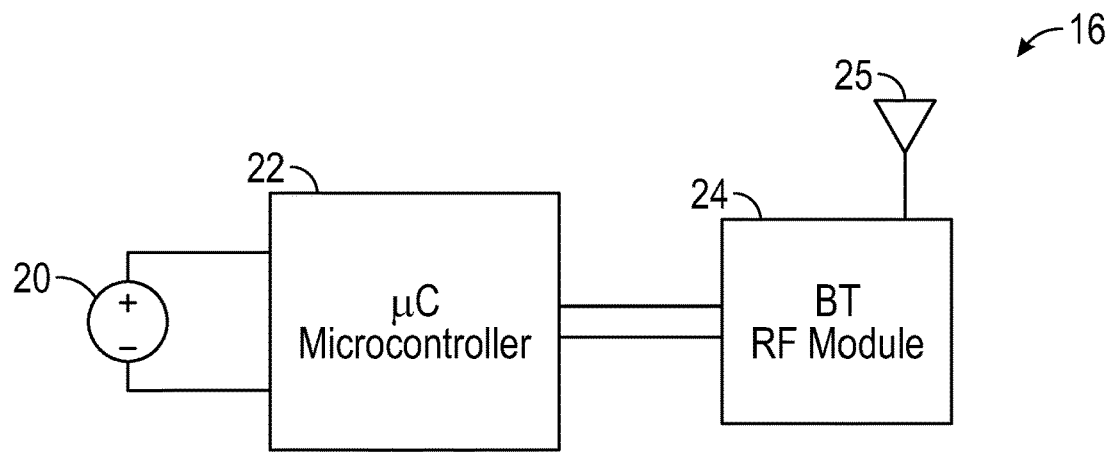
FIG. 3 is a block diagram of one example first tracking element.

Referring to FIG. 3, the first tracking element 16 is powered by a small watch style battery 20 or other small power source. In one example, there is an indication of low battery power. The battery 20 powers a first microcontroller 22. A switch (not shown) may be used to selectively electrically connect the battery 20 to the microcontroller 22, if desired. The case can be opened to enable the battery to be replaced. The first microcontroller 22 communicates with a transceiver 24, such a blue tooth module, having an antenna 25.

The system 10 also includes a secondary carry implement 14 that has a second tracking element 18. The secondary carry implement 18 can be any item that is intended to stay on the user when the user may otherwise temporarily remove the firearm. For example, the secondary carry implement is one of a phone, a watch, a holster, a belt, a piece of jewelry, a credit card, a knife, a pen, a credit card, a key fob, a lanyard, a flashlight, or a belt clip.

The second tracking element 18 may be provided as a removable insert, which may be used separately as a fob. The fob may be provided with a hole so that a key ring may be added, enabling the fob to be more easily carried by the user. In one implementation of the second tracking element 18, the electronics are carried in a pager-sized housing that can be mounted to the user's belt or pocket.

Figure 4:
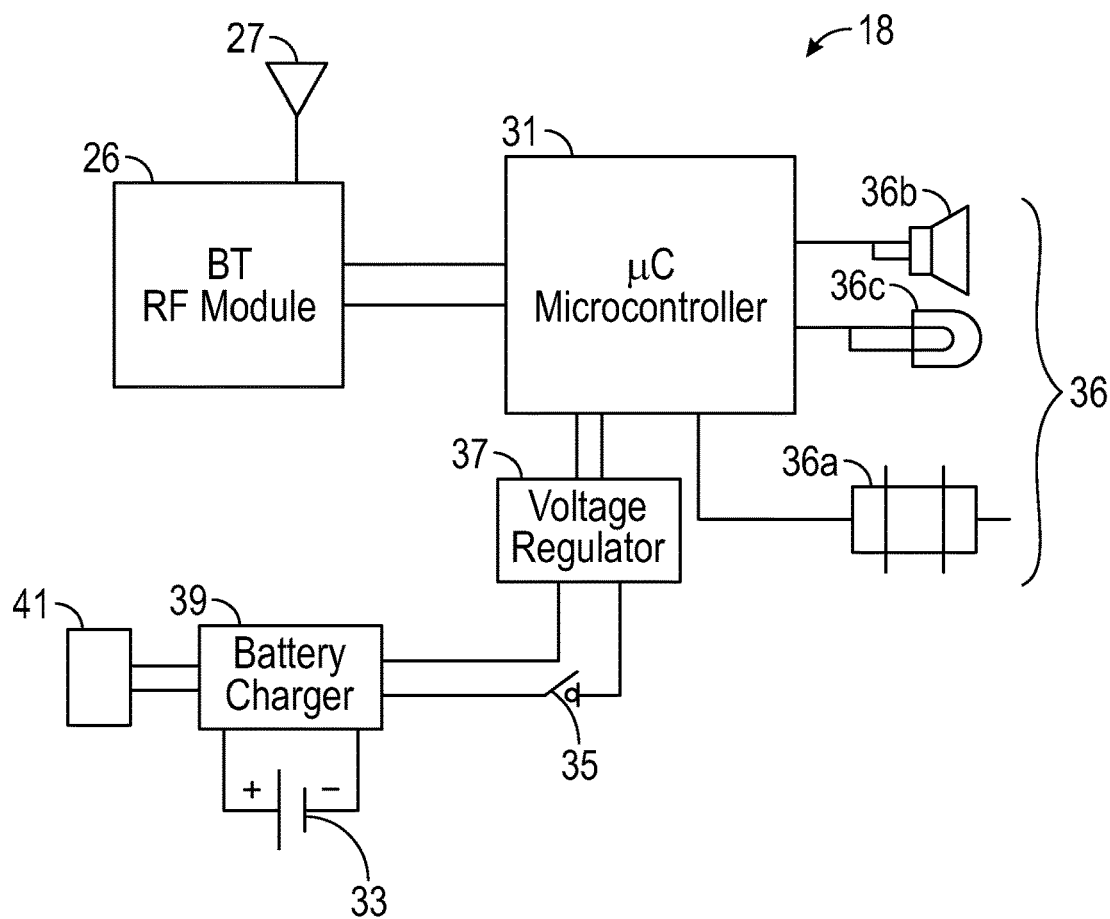
FIG. 4 is a block diagram of one example second tracking element.

Referring to FIG. 4, the second tracking element 18 may be recharged wirelessly via a charging pad or via simple wired connector e.g. via USB cable, or, is powered by a replaceable battery 33 (watch style battery, for example). The second tracking element 18 can be turned off/on, with an indication of state, if desired, with a switch 35. A voltage regulator 37 can be used to regulate voltage from the battery 33 to a desirer voltage. If a rechargeable battery is used, a charging port 41 (e.g., USB) may be provided to supply power from an external source to the battery 33 via a battery charger 39 A second microcontroller 31 communicates with a transceiver 26, such a blue tooth module with an antenna 27. The second tracking element includes an alert component 36, such as a vibrator 36a, a speaker 36b and/or a light 36c.

The light 36c (e.g., LED) can be used to indicate various operational states of the system 10. In one example, the light 36c can be used to convey the following to the user: first and second tracking elements 16, 18 in-range of one another, first and second tracking elements 16, 18 out-of-range of one another, first tracking element low battery, second tracking element low battery, first tracking element fully charged, and/or second tracking element fully charged.

The cases within which the first and second tracking element electronics are packaged are constructed from a material that enables signals from the antennas to be easily transmitted and received. One example material is carbon fiber.

Figure 5:
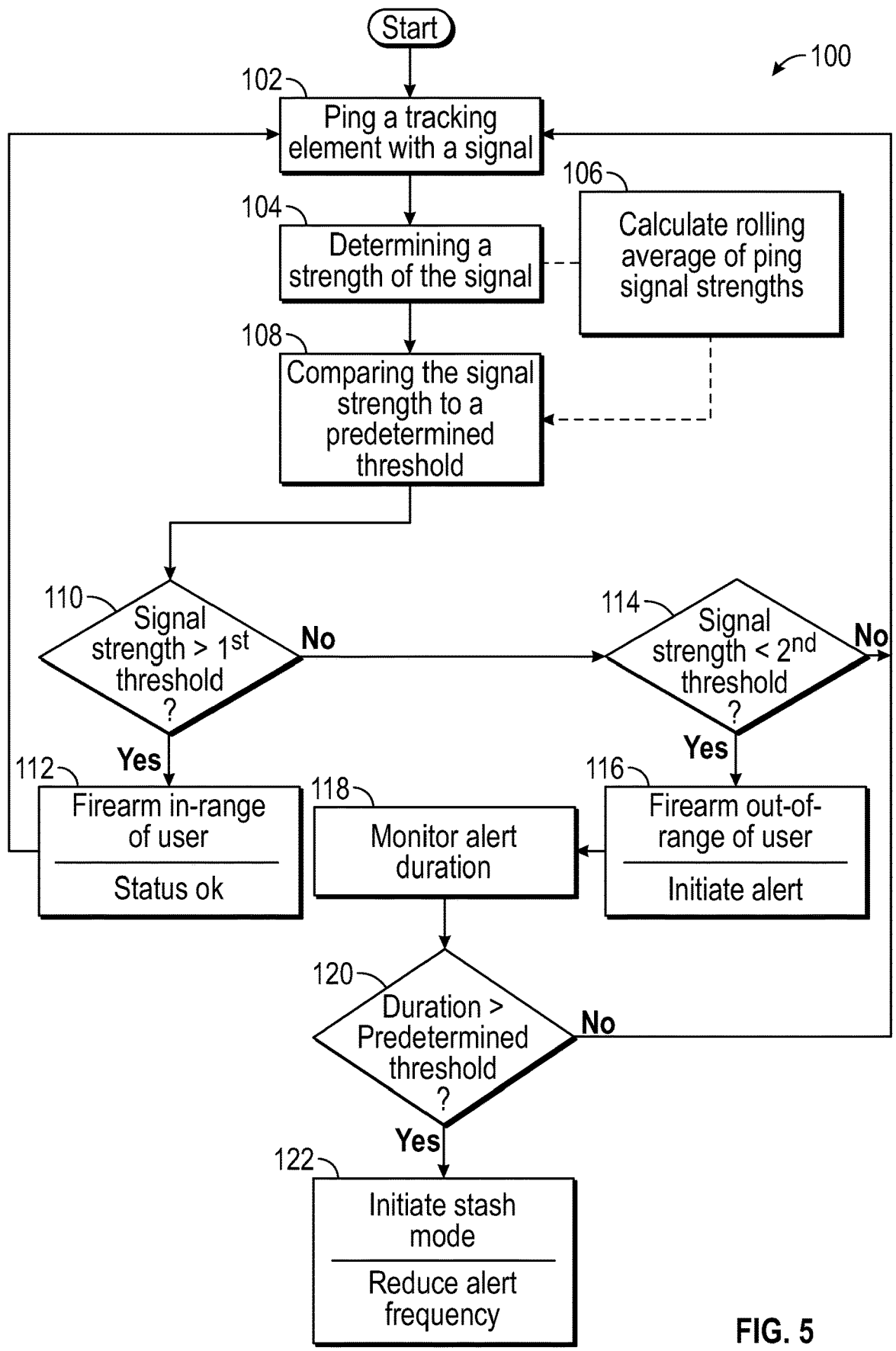
FIG. 5 is a flowchart depicting a method of tracking a firearm.

A method 100 of maintaining possession of a firearm is depicted in FIG. 5A ping having a duration of 1-5 ms, for example, is sent from the first tracking element 16 to the second tracking element (block 102). From this ping, the second tracking element 18 determines a Received Signal Strength Indicator (RSSI) value (block 104). RSSI values may be used as an indication of the Bluetooth signal strength between the elements. These values have hysteresis such that false positives or negatives might occur if the hysteresis is not accounted for. To address this potential issue, a rolling average of RSSI is calculated based upon a predetermined number of signal samples, for example, 4 samples (block 106). So on every received message, the average of last 4 RSSI values is calculated and with this average the proximity determination is made (i.e., in-range or out-of-range). The signal strength is compared to one or more predetermined thresholds (block 108).

The controller 31 determines whether the first and second tracking elements 16, 18 are in-range by comparing the signal strength to a first threshold (block 110). If the average RSSI value is greater than the first, in-range threshold (i.e., the signal is strong because the tracking elements are close), then the firearm is determined to be in-range (block 112). If the average RSSI value exceeds a second, out-of-range threshold (block 114), then the first and second tracking elements 16, 18 are deemed too far apart (block 116; i.e., firearm is undesirably separated from the user). In one example, the out-of-range threshold is at about 95% of the lowest RSSI average, whereas the in-range threshold is at about 40% of the maximum possible RSSI average. But, the first threshold is greater than the second threshold. In one example, the electronics of the first and second tracking elements 16, 18 have a communications rate of every 3 or so seconds, although other transmission rates can be used.

Battery power may be provided separately to each of the first and second tracking elements 16, 18. One of the first and second tracking elements 16, 18 may require no power (e.g., RFID). The ping from the first tracking element 16 may also transmit the battery charging level of the battery 20 to the second tracking element 18. In one example, the battery charging level information is transmitted every 10-20 pings.

The system 10 may also include a "stash" mode where the user may safely but temporarily locate the firearm. In this mode, the second tracking element 18 may also use a timer (block 118) to detect the duration that the first and second tracking elements 16, 18 have been out-of-range. If the duration has exceeded a predetermined threshold (block 120; e.g., several minutes), then the system 10 concluded the separation is intentional, since the user has been continually be reminded via the alert component 36 the entire duration. Once the system 10 enters stash mode, the alert component may operate at a reduced interval to remind the user of the separation from the firearm (block 122).

Figure 7:
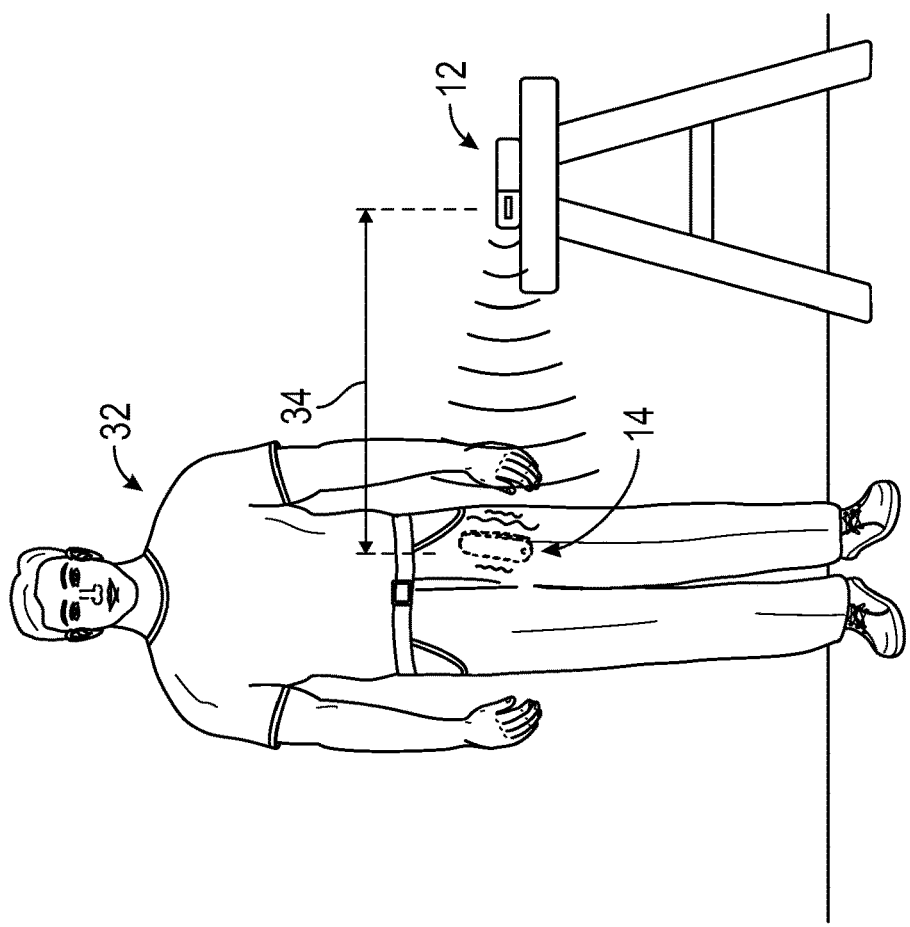
FIG. 7 is a schematic view the first and second tracking elements communicating with one another to alert the user when a predetermined proximity between the firearm and the secondary carry implement has been exceeded.
Figure 6:
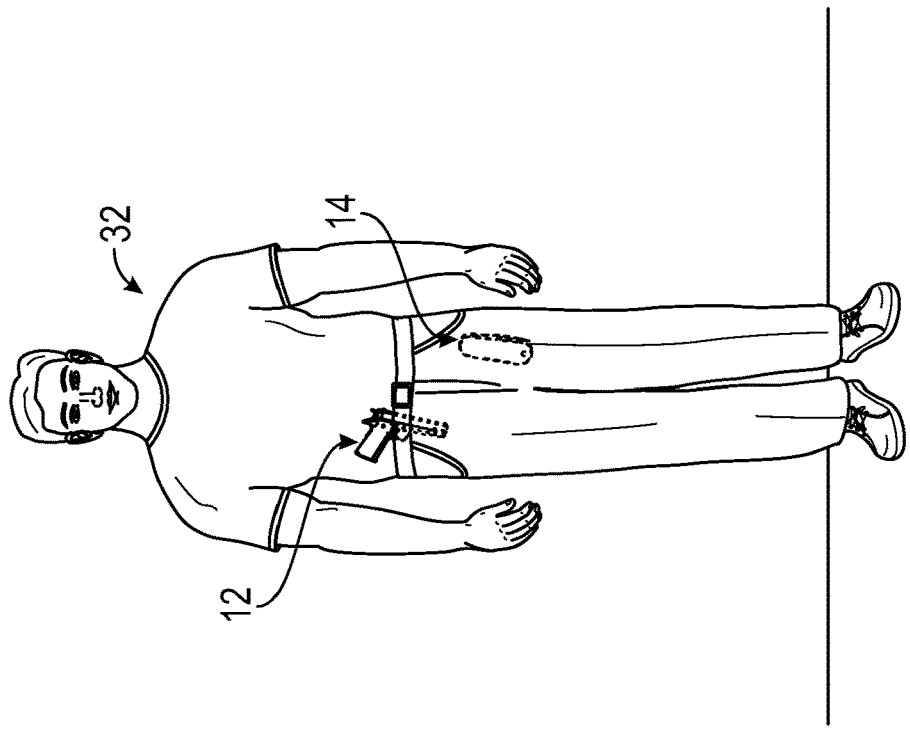
FIG. 6 is a schematic view of a user carrying a firearm with the first tracking element and a secondary carry implement with the second tracking element.

Referring to FIGS. 6 and 7, the controller 22 is configured to activate the alert component 36 when a predetermined proximity 34 or distance between the firearm 12 and the secondary carry implement 14 has been exceeded. The proximity 34 is inferred by the second microcontroller 31 by the signal strength from the antenna 25 that is detected by the transceiver 26 and its antenna 27. As a result, no identifying information is needed by the system 10, which maintains the anonymity and security of the user. That is, the blue tooth signal sent by the transceiver 24 would look like any other blue tooth signals, which are nondescript and ubiquitous. In one example, the distances is in a range of 3-10 feet. Once the distance has been exceeded, the alert component, may be discreetly activated, for example, vibrating a pocket knife in the user's pocket.

In operation, the transceiver 24 periodically sends a ping signal, which is received by the transceiver 26. If the signal strength of this ping signal is above a first threshold, then the transceiver 24 and the transceiver 26 (i.e., the firearm 12 and secondary carry implement 14) are sufficiently close to one another such that it is inferred that the firearm 12 is in the possession of the user 32. If the signal strength of the ping signal is below the first threshold, then the second microcontroller 31 looks to subsequent pings to determine if one of the antennas 25, 27 was temporarily shielded, for example. If successive pings are below the first threshold, then the alert component 36 is activated by the second microcontroller 31.

A signal strength above the first threshold is established to deactivate the alert component 36 when the first and second tracking elements 16, 18 are sufficiently close to one another. This ensures reliability that the user 32 had indeed reestablished possession of the firearm 12.

The disclosed system does not require connectivity to a computer, the internet, a database system, or to GPS for its intended everyday use and does not store any use data. The disclosed method to solve the stated problem does not alter, enhance, limit or interfere with the gun's original functions and is purposely designed not to be considered a "smart gun" technology.

To solve this problem, a wearable proximity alert system (not GPS) is disclosed for use while carrying a gun, either concealed-carry or open-carry. The proximity alert system includes transceivers that are uniquely paired to each other (via Bluetooth transmission, wifi, or RFID, for example).

The transceivers 24, 26 are paired during a setup procedure that is common for Bluetooth devices. When the paired first and second tracking elements 16, 18 are separated by a short distance, the transceiver 26 detects the separation distance, interpreted from signal strength, and the second microcontroller 31 sets off the alert component 36 (a vibration alert, for example) to notify the person of the device separation. The alert notifies the person that a separation has occurred so they can immediately retrieve the gun before it is accidentally left unattended.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A method for maintaining possession of a firearm, comprising the steps of:
   transmitting a signal between a first transceiver coupled to a firearm and a second transceiver of a secondary carry implement, the secondary carry implement having an alert component;
   pairing the first and second transceivers to one another;
   activating the alert component when a predetermined proximity between the firearm and the secondary carry component is exceeded, wherein the predetermined proximity is inferred from signal strength from the first transceiver that is detected by the second transceiver;
   wherein the first and second transceivers communicate wirelessly with one another with a signal provided by a ping, the predetermined proximity is determined from signal strength of the ping alone, wherein the signal carries no identifying information about the first transceiver subsequent to the pairing step and carries no information about the firearm to maintain the anonymity of the first transceiver and the firearm over the signal.

2. The method of claim 1, comprising a step of carrying the firearm and the carry component on a user, and separating the firearm from the user, the activating step performed in response to the separating step.

3. The method of claim 1, comprising a step of providing first and second tracking elements respectively on the firearm and the secondary carry implement.

4. The method of claim 3, wherein the providing step includes stretching a flexible band over a portion of the firearm.

5. The method of claim 3, wherein the providing step includes attaching an adhesive member to the firearm.

6. The method of claim 3, wherein the secondary carry implement is one of a phone, a watch, a holster, a belt, a piece of jewelry, a credit card, a knife, a pen, a credit card, a key fob, a lanyard, a flashlight, or a belt clip.

7. The method of claim 1, wherein the alert component is one of a vibrator, a speaker, or a light.

8. The method of claim 1, wherein the ping has a duration that is transmitted at an interval.

9. The method of claim 8, wherein the signal is based on one of RFID or Bluetooth.

10. The method of claim 8, wherein the signal strength of a multiple of the ping is averaged.

11. A system for maintaining possession of a firearm, the system comprising:
a firearm;
a first tracking element removably secured to the firearm;
a secondary carry implement having a second tracking element with an alert component, the first and second tracking elements in communication with one another; and
a controller provided in one of the first and second tracking elements, the controller configured to activate the alert component when a predetermined proximity between the firearm and the secondary carry implement has been exceeded which is inferred from a signal strength from the first tracking element below a threshold;
wherein the firearm includes a first transceiver, and the secondary carry implement includes a second transceiver, the controller wired to one of the first and second transceivers, the first and second transceivers are configured to be paired to one another and subsequently communicate wirelessly with one another with a signal provided by a ping, the predetermined proximity is determined from signal strength of the ping alone, wherein the signal carries no identifying information about the first transceiver subsequent to being paired and carries no information about the firearm to maintain the anonymity of the first transceiver and the firearm over the signal.

12. The system of claim 11, wherein the first tracking element is a flexible band.

13. The system of claim 12, wherein the firearm includes a grip, and the flexible band is removably arranged about the grip.

14. The system of claim 11, wherein the first tracking element is an adhesive member.

15. The system of claim 11, wherein the alert component is one of a vibrator, speaker or light.

16. The system of claim 15, wherein the alert component is a vibrator.

17. The system of claim 11, wherein the signal is based on one of RFID or Bluetooth.

18. The system of claim 11, wherein the signal strength of a multiple of the ping is averaged.

19. The system of claim 11, wherein the system does not connect to a computer, the internet; a database system, or GPS.

* * * * *